(12) United States Patent
O'Connor

(10) Patent No.: US 10,951,398 B2
(45) Date of Patent: Mar. 16, 2021

(54) REGULATING COMMUNICATION COMPRISING ACCESS TO PROTECTED DATA

(71) Applicant: Avaya Inc., Santa Clara, CA (US)

(72) Inventor: Neil O'Connor, Athenry (IE)

(73) Assignee: Avaya Inc., Santa Clara, CA (US)

( * ) Notice: Subject to any disclaimer, the term of this patent is extended or adjusted under 35 U.S.C. 154(b) by 346 days.

(21) Appl. No.: 15/970,279

(22) Filed: May 3, 2018

(65) Prior Publication Data

US 2019/0342076 A1    Nov. 7, 2019

(51) Int. Cl.
| | |
|---|---|
| *G06F 21/00* | (2013.01) |
| *H04L 9/06* | (2006.01) |
| *G06F 21/60* | (2013.01) |
| *G06Q 40/02* | (2012.01) |

(52) U.S. Cl.
CPC ............ *H04L 9/0643* (2013.01); *G06F 21/60* (2013.01); *G06Q 40/02* (2013.01); *H04L 2209/26* (2013.01); *H04L 2209/38* (2013.01); *H04L 2209/72* (2013.01)

(58) Field of Classification Search
CPC ........ G06F 21/31; G06F 21/33; G06F 21/335; G06F 21/60; G06F 21/602; G06F 21/604; G06F 21/62; G06F 21/6218; G06F 21/6227; G06F 21/64
See application file for complete search history.

(56) References Cited

U.S. PATENT DOCUMENTS

| | | | | |
|---|---|---|---|---|
| 2017/0140408 | A1* | 5/2017 | Wuehler | G06Q 30/0207 |
| 2017/0214522 | A1* | 7/2017 | Code | G06Q 20/3672 |
| 2018/0343114 | A1* | 11/2018 | Ben-Ari | G06F 21/64 |
| 2019/0057382 | A1* | 2/2019 | Wright | H04L 9/3247 |

* cited by examiner

*Primary Examiner* — Edward Zee
(74) *Attorney, Agent, or Firm* — Sheridan Ross P.C.

(57) ABSTRACT

Executable code, placed into a plurality of computing resources forming a distributed ledger, (e.g., "smart contracts") are provided to enable communicating between parties without requiring trust or an intermediary, such as a broker or escrow service. Data may be deposited in a secure data storage for access by a party who satisfies the condition of the smart contract. A resource holding the deposited data then activates a link upon receiving an access token, as produced as a result of satisfying the smart contract. The distributed ledger is then updated to enable other parties to see a description of the data and the terms.

20 Claims, 3 Drawing Sheets

REGULATING COMMUNICATION COMPRISING ACCESS TO PROTECTED DATA

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for secure communications to exchange data and verifiably determine prior communications.

BACKGROUND

Selectively providing access to restricted data is a core feature of many computer systems and networks. Data held by one party may have value to other parties. The value may be determined, at least in part, by the scarcity of the data to other parties. Once provided to one third-party, the value and usability of the data to any other third-party may be changed. Data custodians may have incentives to provide such data to as many third-parties as possible, however, third-parties are often suspicious that the data has already been provided to at least one other third-party. As a result, custodians are often unable to fully monetize their data as third-parties are unwilling to provide full value for data they know or suspect has been, or will be, made available to other parties.

SUMMARY

These and other needs are addressed by the various embodiments and configurations of the present invention. The present invention can provide a number of advantages depending on the particular configuration. These and other advantages will be apparent from the disclosure of the invention(s) contained herein.

In one embodiment, systems and methods are provided to regulate third-party access to protected data. In a further embodiment, a blockchain-based innovation is described which may be utilized to create a new type of open marketplace in which the data, housed within the data custodian's artificial intelligence infrastructure, is exposed to a set of non-trusting third-parties according to the precise terms of defined in advance by the data custodian.

In another embodiment, a verifiable marketplace is provided to enable non-trusting third-parties, in which cohorts of the data may be accessed. The data may be accessed in response to payment of a price or winning a bid and/or reserved with a degree exclusivity agreed to in advance of that particular data coming into existence.

The creation of an open marketplace for any asset, including software data, traditionally requires the nomination of a commonly-trusted party amongst the buyers. The disclosure differs from solutions provided by the prior art, at least in part, by removing the need for trust amongst the participants.

In another embodiment, systems and methods are disclosed, comprising means to regulate and automate irrevocable monetized data access opportunities to a set of non-trusting third parties in a way that facilitates transparent assessment of the scarcity value of the data, and permits a secondary market to function in which further transactions of data are visible and hence create a reliable "trading floor" for data. Once a data store has been created, purchasers (e.g., users in a blockchain) may then purchase and/or resell access to data or other assets.

In one embodiment, "smart contracts" are utilized in a blockchain to, at least in part, advertise the types of access and data available. Smart contracts are known code on a blockchain that self-execute in response to a particular event and automatically implements the terms of a publicly-visible agreement between parties.

Smart contracts are used to expose a range of access types such as historical, bidding, reserve-in-advance, and/or any other access terms chosen by the data custodian. In another embodiment, the smart contract exposes meta data sufficient for the market to assess the value of the underlying data. For example, data exposed may comprise:

[Chat Interactions, Timeframe X, Agent Proficiency, Outcome/Disposition Code] or

[Customer Journey, Mortgage Application, Timeframe, ABC1 Customers, Journey Outcome].

In another embodiment, an indication of the latest bid or for-sale price of the data is held as a variable in the smart contract. Preferably, a minimum of data, as described above, is hosted within the smart contract itself to avoid unnecessarily burdening processing, communication, and/or storage resources.

In another embodiment, a user, such as a third-party customer, provides financial event(s) to the smart contracts in an effort to secure access to the advertised data. The smart contracts access a hash table of references to the actual location of the underlying data within the data custodian's data store. Only the data custodian smart contracts have access to the hash table of references.

When the terms of the smart contract are satisfied, for example that funds have been transferred to it by one of the 3rd party customers, the state of the smart contract is updated to reflect that the data advertised has been released (only the meta data description is readable by all, not the data itself). The option to conceal the identity of the purchaser can be provided, such as may be determined by a system of the data custodian. The commercial terms of the purchase (or prospective purchase) are readable and visible to all within the business logic (i.e. the code) of the smart contract.

It may be preferable to implement the embodiments herein utilizing a smart contract technology that is Turing-Complete, in order to maximize the set of available functionalities for the terms of the smart contracts.

In another embodiment, a mutually encrypted session is used to allow the successful third-party access the data, once they fulfilled their portion of the smart contract's requirements.

Embodiments herein provide additional benefits, including, the market for data is more transparent, in that the users (customers, prospective customers) know who has bought what data and therefore the scarcity value of the data can be independently verified. In addition, any party that purchases exclusive access to data can verify that it has not been shared with others.

In another embodiment a smart contract can advertise forthcoming data from the data custodian. For example, if a major announcement is pending that is of interest to several artificial intelligent (AI) applications, and is likely to lead of the generation of valuable data for a period of 1-2 hours following the announcement (e.g. the first public showcase of the latest iPhone®), then third-parties can interact with a smart contract that has been codified and published by the data custodian to process the release of the data. The data custodian may choose to expose the data to a subset of parties, such as the joint top three bidders. The terms of the contract would be irrevocably executed and independently verifiable by all parties including those that chose not to purchase the terms. In this way third-parties may assess the opportunity loss for the failed bidders and encourage more active participation in future.

In a further embodiment, a secondary market for the data previously purchased is provided. In this embodiment, the non-trusting third-parties may choose to sub-share and/or resell the data purchased from the data custodian. The fact that the data is being transacted once again allows the market participants to assess the value of the data on an ongoing basis. The creation of a trustable marketplace for the data custodian's data within a cohort of non-trusting parties underpins a healthy trading environment.

In one embodiment, a method is disclosed to enable a communication between a first device and an untrusted second device, the method comprising: generating a first data block for an ordered list of data blocks comprising a chronological accounting of transaction for an associated deposited data, the first data block including identification information of the deposited data and an input term; communicating the ordered list to a communication resource accessible to a second device associated with a second user; providing to at least one secondary device of a corresponding secondary users at least the first data block of the ordered list; upon being presented with an access token by an unspecified user of the users, activating a link to the deposited data; and presenting the deposited data to the unspecified user when requested via the activated link; and wherein the first data block, in response to receiving a submitted input, causes a self-executing code of the first data block to execute and evaluate the submitted input and, when the self-executing code determines the submitted input satisfies the input term, outputs the access token.

In another embodiment, a system is disclosed, comprising: a first device: a network interface to a network; a data storage; a microprocess; and wherein the microprocessor: generates a first data block for an ordered list of data blocks comprising a chronological accounting of transaction for an associated deposited data, the first data block including identification information of the deposited data and an input term; communicating the ordered list to a communication resource accessible to a second device associated with a second user; provides to at least one secondary device of a corresponding secondary users at least the first data block of the ordered list; upon being presented with an access token by an unspecified user of the users, activating a link to the deposited data; and presents the deposited data to the unspecified user when requested via the activated link; and wherein the first data block, in response to receiving a submitted input, causes a self-executing code of the first data block to execute and evaluate the submitted input and, when the self-executing code determines the submitted input satisfies the input term, outputs the access token.

In another embodiment, a device is disclosed, comprising: a network interface to a network; a data storage; a microprocess; and means to generate a first data block for an ordered list of data blocks comprising a chronological accounting of transaction for an associated deposited data, the first data block including identification information of the deposited data and an input term; means to communicate the ordered list to a communication resource accessible to a second device associated with a second user; means to provide to at least one secondary device of a corresponding secondary users at least the first data block of the ordered list; upon being presented with an access token by an unspecified user of the users, means to activate a link to the deposited data; and means to presents the deposited data to the unspecified user when requested via the activated link; and wherein the first data block, in response to receiving a submitted input, causes a self-executing code of the first data block to execute and evaluate the submitted input and, when the self-executing code determines the submitted input satisfies the input term, outputs the access token.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shah include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
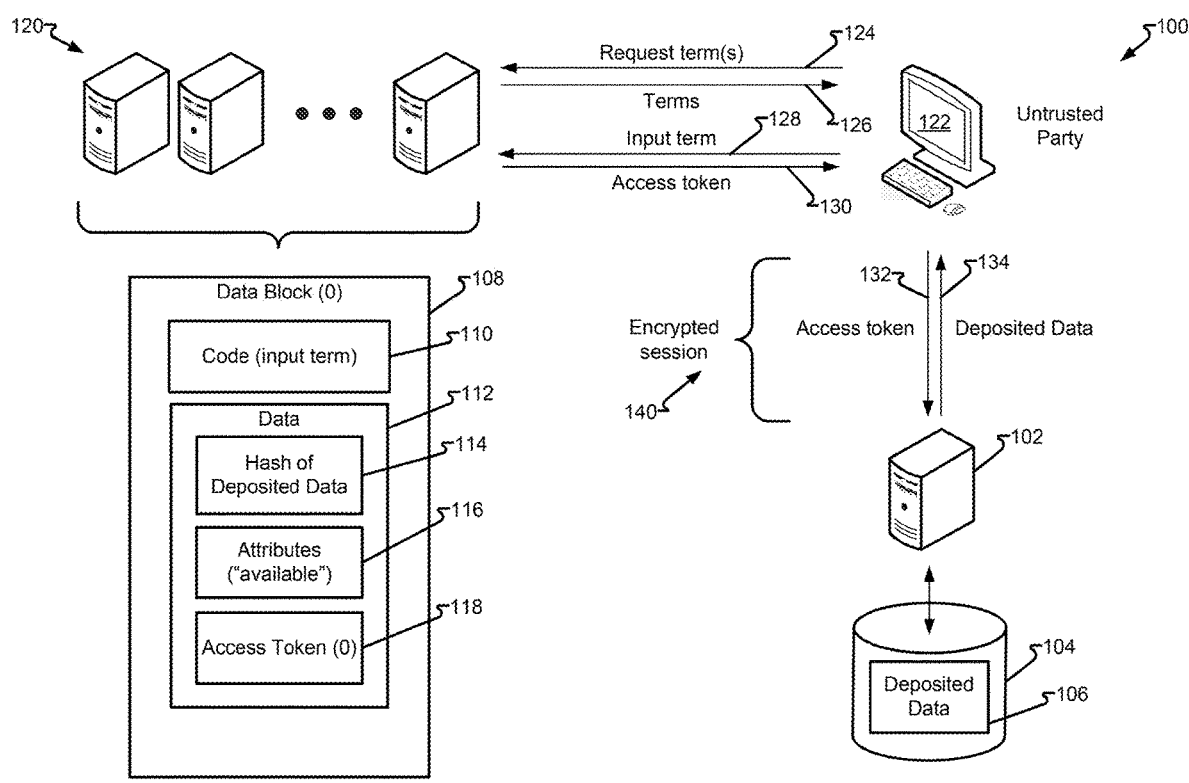
FIG. 1 depicts a system in accordance with embodiments of the present disclosure.

FIG. 1 depicts system 100 in accordance with embodiments of the present disclosure. In one embodiment, computer 122 (or user associated with and using computer 122) is an untrusted party. Computer 122 may be known with certainty (e.g., unique identifier, user name, etc.), known with at least a certain degree of specificity (e.g., "requestor #123," etc.), or unknown. Computer 122 requests deposited data 106, within database 104, is under the control of custodian device 102. As is known in the prior art, computer 122 may become trusted or utilize a trusted intermediary in order to allow computer 122 to access restricted data, such as deposited data 106. However, to avoid such overhead, and in another embodiment, data block 108 is created and, once satisfied, allows computer 122 to access deposited data 106 and thereby omit the overhead and/or other disadvantages of becoming trusted and/or the involvement of trusted third-parties.

In another embodiment, deposited data 106 is processed, such as by one or more microprocessors of custodian device 102, to produce a unique identifier. The unique identifier may be globally unique or sufficiently unique to for a particular environment and/or timeframe such that no two different versions deposited data 106 would produce a unique identifier that is not unique within the confines of a particular system. In one embodiment, deposited data 106 is processed to produce a unique identifier comprising a hash. In another embodiment, deposited data 106 is processed to produce a checksum. The hash may be incorporated as a data element in block 108, such as hash 114 of data elements 112. Additionally or alternatively, data element 112 may provide an address (e.g., pointer, link, address, etc.) to hash values, meta data descriptions, and or other information regarding, deposited data 106, but not the content itself of deposited data 106.

Data block 108 may be generated by a microprocessor, such as one or more microprocessors incorporated within or accessible to custodian device 102 and/or other computing resource. Data block 108 is generated to comprise data elements 112 which further comprise hash 114, attributes 116, and access token 118. Data block 108 may further include code 110. Code 110 comprises readable terms of the "contract" and reveal what is provided upon receiving an input term that satisfies a condition of the code 110. For example, an entity making or causing an input term to be provided to data block 108 may be evaluated and determined to satisfy a condition in order to obtain access to a resource or a means to obtain the resource, such as access token 118. For example, a payment (e.g., bitcoin, account number, etc.) is provided as an input term to code 110 along with any other input terms that may be required, and as a result provide an output in the form of access token 118 to the party making the payment, or on whose behalf the, payment is made.

Attributes 116 may comprise a particular state indicator. For example, "available," "sold," "modified," and/or other states. States may be variously embodied such as to indicate availability, availability to a certain party, non-availability to a certain party, etc. For example, block 108 may be associated with deposited data 106 for which the custodian wishes to obtain the highest price. Therefore, attribute 116 may indicate a current bid, parties that are eligible/ineligible, and/or other conditions. It should be appreciated that attribute 116 may be updated or a subsequent linked block created, with the modified attribute 116, in an ordered list comprising data block 108 and the subsequent block. Additionally, attribute 116 may comprise a single data element or a structure comprising a plurality of data elements. Attribute 116 may comprise other data storage elements, such as a timestamp, after which a bidding or other availability period closes, an identifier of a current high-bidder, and/or other data. Attribute 116 may also comprise a human or machine-readable description of deposited data (e.g., "Transactions for the month of February;" "Data elements 'X', 'Y', 'Z';" "Media file 'X'"; etc.).

Data block 108 is self-executing, in that once presented to communication resource 120, it may be called without an explicit execute command. Data blocks, such as data block 108, may also comprise encrypted portions, unique identifiers, and/or other data elements (not shown) to enable data block 108 to be presented to, and execute on, communication resource 120.

In another embodiment, data block 108 is provided to communication resource 120, such as one or more computing and communicating resources (e.g., servers, computers, microprocessors, etc.) providing a distributed ledger of data block 108 and any other data blocks provided in an ordered list comprising data block 108.

An untrusted party utilizing computer 122 makes request 124 to obtain the code from data block 108 where code 110 of data block 108 may be examined and, in response, terms of code 110 are provided back to computer 122. To complete the transaction, computer 122 provides input term 128 to data block 108 executing on communication resource 120. Code 110 is automatically executed and, if the provided input term 128 and/or other inputs, satisfy code 110, access token 118 is provided 130 to computer 122. It should be appreciated that in another embodiment, computer 122 may utilize another computing resource as a proxy to provide input term 128. For example, computer 122 may signal a digital wallet (not shown) to provide input term 128 (e.g., cryptocurrency) to communication resource 120 on behalf of computer 122.

In another embodiment, custodian device 102 is presented with access token 132 and provides the party (e.g., computer 122) that provided access token 132 with a link activated such that deposited data 106 may be retrieved and presented to computer 122 in transaction portion 134. Transaction portions 132 and/or 134 may be implemented as encrypted session 140, such as when access token is a public key of a public-private key pair and custodian device 102, validates the public key and determines access is authorized for the presenting party to obtain deposited data 106. Access may be provided in the form of an activated link, decryption operation, and/or other step whereby unauthorized parties are unable to access deposited data 106 and a party presenting access token 132 is enabled to access deposited data 106.

It should be appreciated that components of communication resource 120, computer 122, and custodian device 102 may each comprise a network interface and/or access a network interface to at least one network (e.g., telecommunications, Internet, ethernet, WiFi, etc.) to enable communications therebetween and comprise one or more microprocessors, memory, inter-device bus, and/or other computational equipment.

In another embodiment, computer 122, after acquiring deposited data 106, computer 122 may perform a published hash operation on deposited data 106. Should the resulting hash differ from hash 114, computer 122 was provided with deposited data that is different from deposited data 106.

Code 110 may require a bidding process, such that attributes 116 maintain an identity of a bidder and a timestamp. When code 110 executes and determines the current time is equal to or greater (i.e., at or past) the time of the timestamp, code 110 closes the bidding processes and awards access token 118 to the identified bidder. Prior to the timestamp expiring, a subsequent bid may be replaced by a higher bidder. Each bid and associated bidder may result in the creation of a new data block, such as described in more detail with respect to FIG. 2. Alternately or additionally, data associated with bidding, bidders, and/or other transient data may be provided to an accessible storage having a location indicated in an attribute 116 of data block 108.

Figure 2:
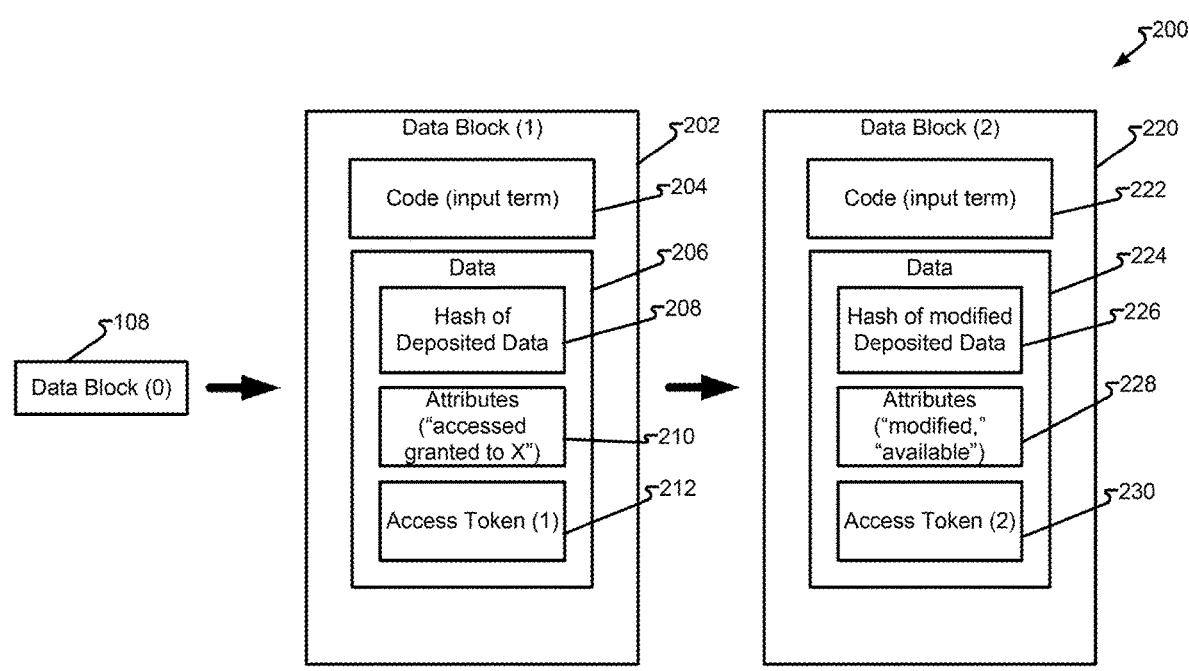
FIG. 2 depicts a plurality of data blocks in accordance with embodiments of the present disclosure.

FIG. 2 depicts plurality of data blocks 200 in accordance with embodiments of the present disclosure. In one embodiment, data blocks 200 form an ordered list, such as comprising data block 108, data block 202, and data block 220. In one embodiment, data blocks 200 are provided to communication resource 120. Data blocks 108, 202, 220 may differ in one or more data values. For example, data block 108 may indicate an associated deposited data is accessible. Once placed into the communication resource, data block 108 may be unmodifiable. However, as an element of an ordered list, a subsequent event, such as computer 122 being granted access to deposited data 106, may result in data block 108 creating data block 202, which comprises attribute 210 indicating that access has been granted. In another example, computer 122 may modify deposited data 106 and cause custodian device 102 to maintain, such as within database 104, a modified version of the deposited data. Accordingly, data block 220 may be separate from (as a new data element) or within the ordered list comprising data blocks 200 to indicate that a modified form of deposited data 106 is available for terms 222, identified by hash 224, and the party satisfying the input terms 222 will be provided with access token 230 to the modified version of deposited data 106.

Data block 202 may comprise code with input term 204, which may be null, such as when data block 202 is utilized for informative purposes (e.g., to indicate that data block 108 is no longer the most recent data block in the ordered list). Data 206 may be copied, at least in part, from data 112, such as hash 208 is a copy of hash 114. However, when data 206 is associated with an informative data block, such as data block 202, data 206 may be, at least in part, truncated. For example, access token 118 may be copied to access token 212, which is made unusable or omitted, such as to afford computer 122 time to access deposited data 106.

Data block 220, associated with a modified version of deposited data 106, may comprise code 222 that allowed one to determine the input terms required to obtain the modified version of deposited data 106, has 226 of the modified version of deposited data 106, attributes 228, and access token 230. Access token 230 being provided a party upon satisfying code 222 and enabling access to the modified version of deposited data 106.

Figure 3:
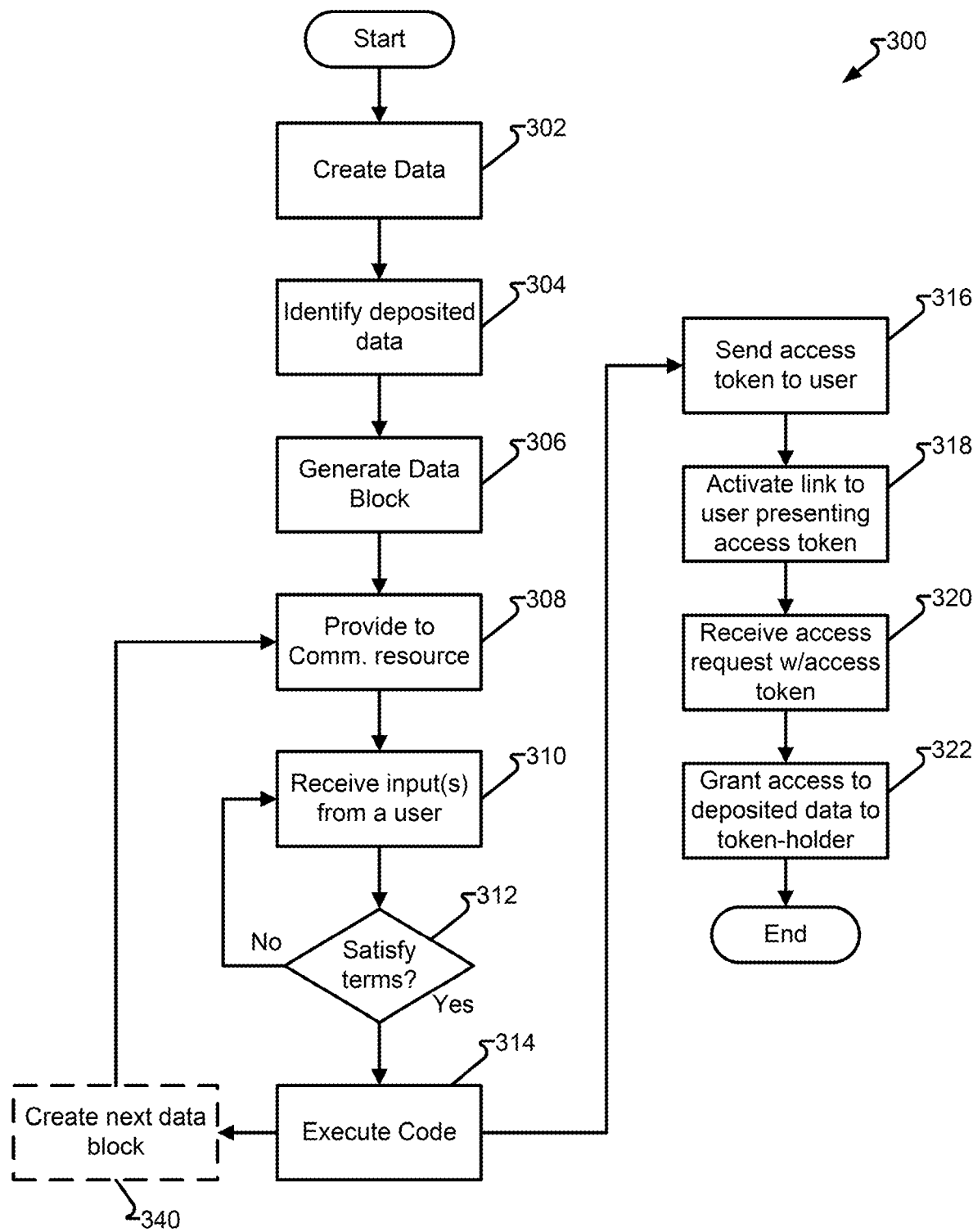
FIG. 3 depicts a process in accordance with embodiments of the present disclosure.

FIG. 3 depicts a process 300 in accordance with embodiments of the present disclosure. In one embodiment, at least a portion of process 300 is executed by one or more microprocessors incorporated within or accessible to custodian device 102. In other embodiments, a discrete device, comprising one or more processors performs at least a portion of process 300. Process 300 begins with the creation of data 302. Data may be generated via computation output, recording, transcription, and/or other process. Step 302 may be executed by one or more computational resources (not shown) such as servers, mobile devices, telecommunication endpoints, etc. whereby step 302 accesses the data. Step 304 identifies deposited data 304, such as at least a portion of the data created/identified in step 302.

Step 306 generates a data block, such as data block 108 and provides the generated data block to communication resource 120 in step 308. Step 310 receives at least one input from a user, such as computer 122. Code 110 within data block 108 executes upon receiving the input term in step 310 and executes code in to evaluate the input terms in step 312. If step 312 is determined in the negative, process 300 may continue back to step 310 to await another input. If step 312 is determined in the affirmative, process 300 may continue to step 314 whereby code 110 is executed that is associated with satisfaction of the condition evaluated in step 312, for example, to provide access token 118 to the party providing the input term evaluated by code 110, in step 316.

Optionally step 314 may cause step 340 to be executed, such as to create a new block, such as data block 202, to indicate that the condition of code 110 has been satisfied and optionally the identity of the party providing the satisfactory input term. The new block then been provided, as a portion of an ordered list, to communication resource 120 in step 308. Step 318 activates a link to the deposited data upon being presented with the access token. Step 320 receives the request for the deposited data and provides the deposited data in step 322.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose microprocessor (e.g., GPU, CPU), or logic circuits programmed with the instructions to perform the methods (e.g., FPGA). In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method to enable a communication between a first device and an untrusted second device, the method comprising:
   generating a first data block of an ordered list of data blocks comprising a chronological accounting of a transaction for an associated deposited data, the first data block including identification information of the associated deposited data and an input term;
   communicating the ordered list of data blocks to a communication resource accessible to a second device;
   providing to at least one secondary device at least the first data block of the ordered list of data blocks;
   upon being presented with an access token by an unspecified device, activating a link to the associated deposited data; and
   presenting the associated deposited data to the unspecified device when requested via the activated link; and
   wherein the first data block, in response to receiving a submitted input, causes a self-executing code of the first data block to execute and evaluate the submitted input and, when the self-executing code determines that the submitted input satisfies the input term, outputs the access token.

2. The method of claim 1, wherein the identification information comprises a hash of the associated deposited data.

3. The method of claim 1, wherein the identification information comprises a checksum value of the associated deposited data.

4. The method of claim 1, wherein:
   the self-executing code, in response to determining the submitted input satisfies the input term, generates a second data block of the ordered list of data blocks comprising submitted input; and
   communicating the second data block to the communication resource.

5. The method of claim 4, wherein the second data block further comprises a modified input term.

6. The method of claim 1, further comprising:
   producing a modified deposited data from a modification of the associated deposited data;
   generating a second data block for the ordered list of data blocks, the second data block including identification information comprising of the modified deposited data and a second input term;
   communicating the second data block to the communication resource;
   providing to the at least one secondary device at least the second data block of the ordered list of data blocks;
   upon being presented with a second access token by a second unspecified device, activating a second link to the modified deposited data; and
   presenting the modified deposited data to the second unspecified device when requested via the activated second link; and
   wherein the second data block, in response to receiving a second submitted input, causes a second self-executing code of the second data block to execute and evaluate the second submitted input and, when the second self-executed code determines the second submitted input satisfies the second input term, outputs the second access token.

7. The method of claim 1, wherein:
   the input term comprises a first component and a second component;
   the first component comprises a first term and a first acquiring identifier uniquely identifying at least a first acquiring device;
   the second component comprises a second term, and a second acquiring identifier uniquely identifying at least a second acquiring device, different from the first acquiring device;
   the first data block, in response to receiving the submitted input comprising each of a first submitted input, originating from the first acquiring identifier, and a second submitted input, originating from the second acquiring identifier, causes the self-executing code of the first data block to execute and evaluate the submitted input and, when the self-executing code determines the submitted input satisfies the input term, outputs the access token to at least one of the first acquiring device or the second acquiring device; and
   upon being presented with the access token, activating the link to the associated deposited data.

8. The method of claim 1, wherein:
   the first data block comprises a timestamp with a provided value and a stored input;
   receiving the submitted input, causes the self-executing code of the first data block to execute and evaluate the submitted input and, when the self-executing code determines the submitted input is greater than the stored input, stores the submitted input as the stored input and an acquiring identifier uniquely identifying at least a first acquiring device; and
   the self-executing code comprises a determination process, wherein the determination process executes upon a current time being equal to or greater than the timestamp, outputs the access token to the acquiring identifier.

9. The method of claim 1, wherein:
   the first data block comprises a first timestamp; and
   the self-executing code comprises a determination process and a second timestamp, wherein the determination process executes, upon the first timestamp being equal to or greater than the second timestamp, and modifies the input term.

10. A system, comprising:
    a first device:
       a network interface to a network;
       a data storage; and
       a microprocessor; and
       wherein the microprocessor:
          generates a first data block for an ordered list of data blocks comprising a chronological accounting of a transaction for an associated deposited data, the first data block including identification information of the associated deposited data and an input term;
          communicates the ordered list of data blocks to a communication resource accessible to a second device;

provides to at least one secondary device at least the first data block of the ordered list of data blocks;

upon being presented with an access token by an unspecified device, activates a link to the associated deposited data; and presents the associated deposited data to the unspecified device when requested via the activated link; and wherein the first data block, in response to receiving a submitted input, causes a self-executing code of the first data block to execute and evaluate the submitted input and, when the self-executing code determines that the submitted input satisfies the input term, outputs the access token.

11. The system of claim 10, wherein the identification information comprises a hash of the associated deposited data.

12. The system of claim 10, wherein the identification information comprises a checksum value of the associated deposited data.

13. The system of claim 10, wherein:
the self-executing code, in response to determining the submitted input satisfies the input term, generates a second data block of the ordered list of data blocks comprising submitted input; and
communicating the second data block to the communication resource.

14. The system of claim 10, wherein the microprocessor further:
produces a modified deposited data from a modification of the associated deposited data;
generates a second data block for the ordered list of data blocks, the second data block including identification information comprising of the modified deposited data and a second input term;
communicates the second data block to the communication resource;
provide to the least one secondary device at least the second data block of the ordered list of data blocks;
upon being presented with a second access token by a second unspecified device, activates a second link to the modified deposited data; and
presents the modified deposited data to the second unspecified device when requested via the activated second link; and
wherein the second data block, in response to receiving a second submitted input, causes a second self-executing code of the second data block to execute and evaluate the second submitted input and, when the second self-executing code determines the second submitted input satisfies the second input term, outputs the second access token.

15. The system of claim 10, wherein:
the input term comprises a first component and a second component;
the first component comprises a first term and a first acquiring identifier uniquely identifying at least a first acquiring device;
the second component comprises a second term and a second acquiring identifier uniquely identifying at least a second acquiring device different from the second device;
the first data block, in response to receiving the submitted input comprising each of a first submitted input, originating from the first acquiring identifier, and a second submitted input, originating from the second acquiring identifier, causes the self-executing code of the first data block to execute and evaluate the submitted input and, when the self-executing code determines the submitted input satisfies the input term, outputs the access token to at least one of the first acquiring device or the second acquiring device; and
upon being presented with the access token by activating the link to the associated deposited data.

16. A device, comprising:
a network interface to a network;
a data storage;
a microprocessor; and
means to generate a first data block for an ordered list of data blocks comprising a chronological accounting of a transaction for an associated deposited data, the first data block including identification information of the associated deposited data and an input term;
means to communicate the ordered list of data blocks to a communication resource accessible to a second device;
means to provide to at least one secondary device at least the first data block of the ordered list of data blocks;
upon being presented with an access token by an unspecified device, means to activate a link to the associated deposited data; and
means to presents the associated deposited data to the unspecified device when requested via the activated link; and
wherein the first data block, in response to receiving a submitted input, causes a self-executing code of the first data block to execute and evaluate the submitted input and, when the self-executing code determines that the submitted input satisfies the input term, outputs the access token.

17. The device of claim 16, wherein:
the first data block comprises a timestamp with a provided value, a stored input;
the means to receive the submitted input, triggers a means to cause the self-executing code of the first data block to execute and evaluate the submitted input and, when the self-executing code determines the submitted input is greater than the stored input, stores the submitted input as the stored input and an acquiring identifier uniquely identifying at least a first acquiring device, as one second device; and
the self-executing code comprises a determination process, wherein the determination process executes upon a current time being equal to or greater than the timestamp, outputs the access token to the acquiring identifier.

18. The device of claim 16, wherein:
the first data block comprises a first timestamp; and
the self-executing code comprises a determination process and a timestamp, wherein the determination process executes upon a current time being equal to or greater than the first timestamp, modifies the input term.

19. The device of claim 16, wherein:
the self-executing code, in response to determining the submitted input satisfies the input term, generates a second data block of the ordered list of data blocks comprising submitted input; and
means to communicate the second data block to the communication resource.

20. The device of claim 19, wherein the second data block further comprises a modified input term.

* * * * *